Dec. 23, 1941.  T. A. BOWERS  2,267,366
PISTON RING
Filed June 16, 1939   2 Sheets-Sheet 1
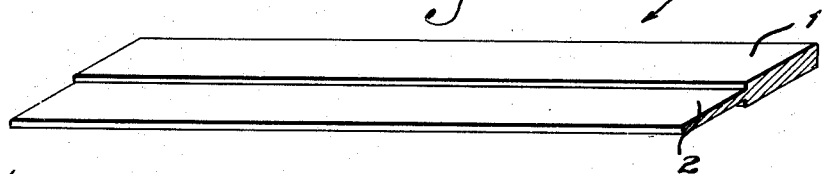
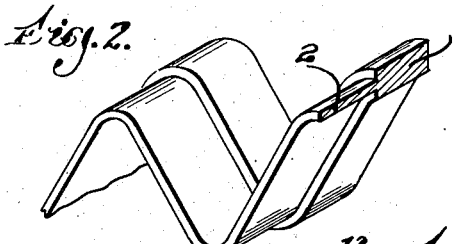
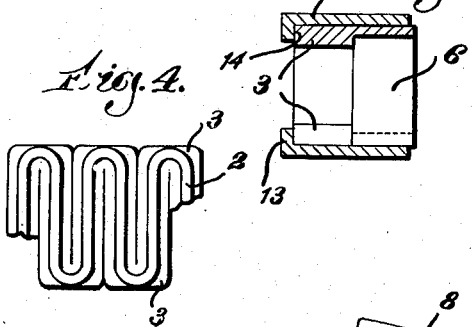
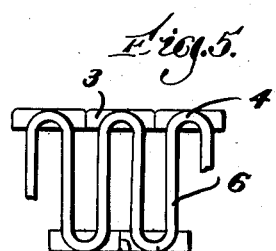
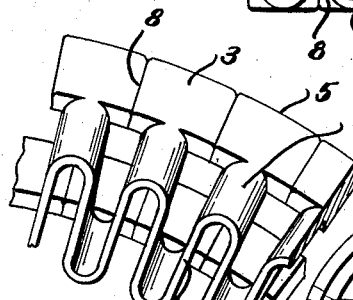
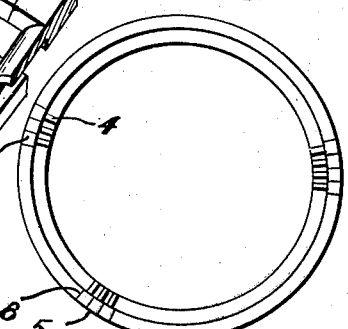
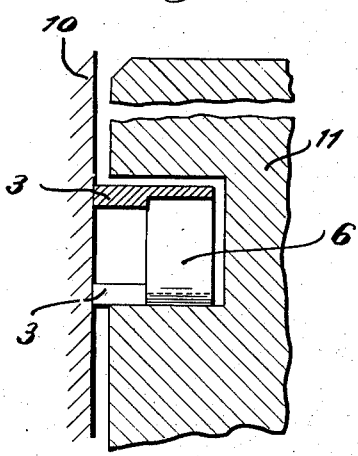
Inventor
Thomas A. Bowers
by
Attorney Dec. 23, 1941. T. A. BOWERS 2,267,366
PISTON RING
Filed June 16, 1939 2 Sheets-Sheet 2
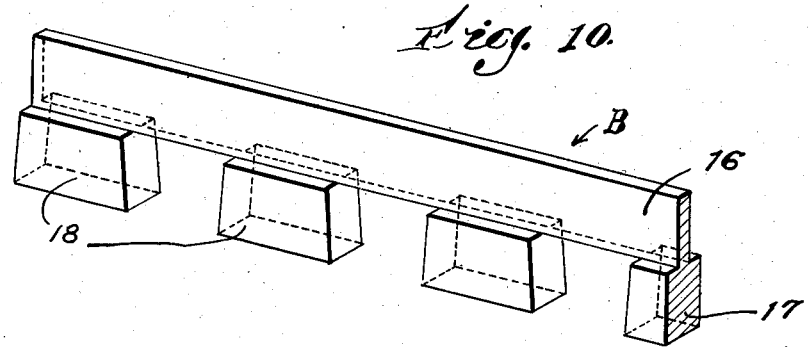
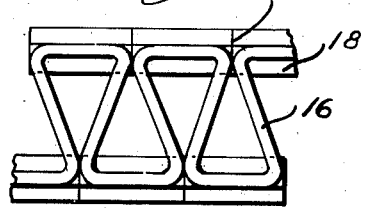
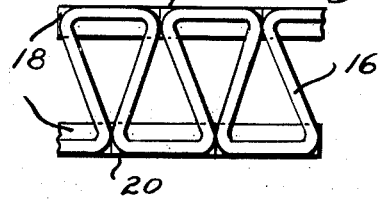
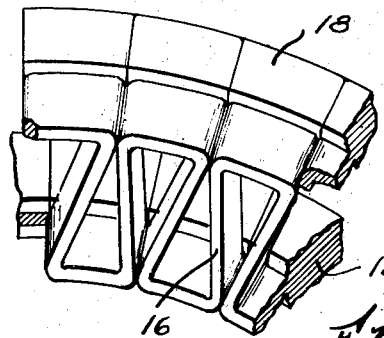
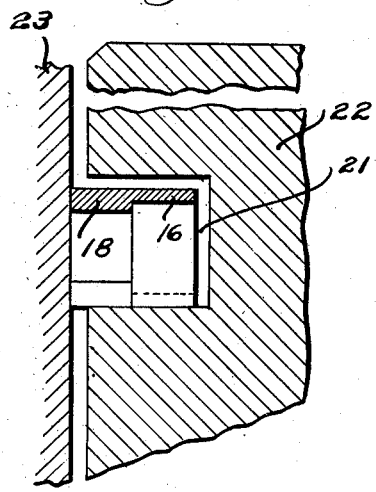
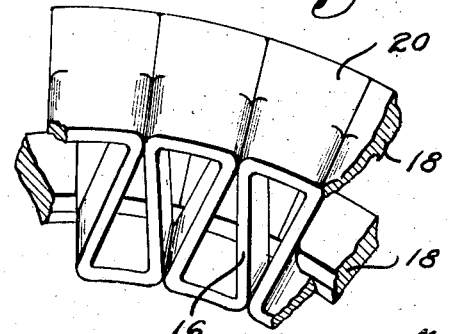
Inventor
Thomas A. Bowers
By
Attorney Patented Dec. 23, 1941

2,267,366

UNITED STATES PATENT OFFICE 2,267,366

PISTON RING

Thomas A. Bowers, Boston, Mass., assignor to Power Research Corporation, Boston, Mass., a corporation of Massachusetts Application June 16, 1939, Serial No. 279,474

7 Claims. (Cl. 309—45)

This invention relates to piston rings and more especially to oil control ring structures and assemblies.

During operation of a motor it is necessary that a film of oil suitable for effecting proper lubrication of sealing members be maintained on the cylinder but it is desirable that no excess of oil be left sufficient to pass by the sealing members to become burned by combustion gases or to collect in the head of the cylinder, thereby to reduce engine efficiency and create excess oil consumption. Difficulty is experienced in fulfilling these conditions especially in cylinders which have been worn "tapered" or "out-of-round." C-type oil rings hitherto employed have been beveled to present a single scraping edge or recessed to present top and bottom scraping edges. These rings fail to become completely expanded against the worn areas of the cylinder referred to, either due to faulty expansibility or non-uniformity in expansion pressure resulting from the split construction of C-type rings. This results in inefficient oil scraping. Also openings, provided through the oil rings for the oil to pass through and back into the crank case, tend to become clogged. Increasing the size of the openings weakens the ring body and the size of the openings therefore is necessarily limited.

In high-speed motors, these difficulties become magnified and in an attempt to overcome them structures have been proposed comprising light C-type scraper rings having a plurality of scraping edges spaced apart by a slotted solid C-type ring and maintained against the cylinder wall by means of a separate expander member of strongly resilient character. Such assemblies while of faster operation are still limited in expansibility and their expansion is non-uniform on the cylinder. In addition they are much more expensive and more difficult to assemble.

It is a chief object of this invention to provide a piston ring for effecting improved and more efficient oil distribution in a cylinder. It is a further object of the invention to improve oil control in worn cylinders and in high-speed motor operation. The invention also aims to present an improved expander means for piston rings.

The invention will be readily understood from the following description when read in connection with the accompanying drawings and the novel features will be more particularly pointed out in the appended claims.

In the drawings:

Fig. 1 is a perspective view illustrating a length of formed material employed in making my improved ring material.

Fig. 2 is another perspective view of the material indicated in Fig. 1, and illustrates the step of reversely folding the material in the formation of a ring.

Fig. 3 is a view in elevation illustrating a further step of compacting the reversely folded material of Fig. 2.

Fig. 4 is a view in elevation and illustrates the step of flattening portions of the material of Fig. 3.

Fig. 5 is a view similar to Fig. 4 and illustrates a final step of cutting away portions of folded material.

Fig. 6 is a perspective view further illustrating the material shown in Fig. 5.

Fig. 7 is a plan view of a finished ring of material formed from a material such as that illustrated in Figs. 5 and 6.

Fig. 8 is a fragmentary view in cross section illustrating a piston and cylinder having a ring such as that shown in Fig. 7 assembled therewith.

Fig. 9 is a detail cross section illustrating the association of separate oil scraping rings with a ring of the construction shown in Fig. 7.

Fig. 10 is a perspective view illustrating a length of punched stock employed in making a modification of oil ring member.

Fig. 11 is a view in front elevation fragmentarily illustrating a length of material such as that shown in Fig. 10 in a reversely folded state.

Fig. 12 is a view similar to Fig. 11 illustrating the reversely folded material with portions of crowns having been cut away.

Fig. 13 is a perspective view fragmentarily illustrating the material shown in Fig. 11.

Fig. 14 is another view in perspective illustrating the material shown in Fig. 12; and Fig. 15 is a view in cross section fragmentarily illustrating a piston and cylinder having installed therein a ring such as has been indicated in Figs. 11–14 inclusive.

In accordance with my invention I provide a unitary oil control ring structure, better illustrated in Figs. 6 and 7, which is fabricated from a length of ribbon-like material reversely folded upon itself to present a radially expansible supporting structure presenting outer crown portions which form oil scraping edges.

In a preferred method of making the ring I may employ a length of material A, preformed, as illustrated in Fig. 1, to present a relatively thick portion 1 and a relatively thin portion 2.

I may also treat a flat ribbon, as by rolling, to secure a ribbon stock with a thinned edge of substantially those proportions shown in Fig. 1. The material A will preferably be composed of steel although materials as for example alloys and other suitable composition may be employed.

A suitable length of this material is bent or reversely folded upon itself as illustrated in Fig. 2. The points of bending may be spaced to provide a desirable length for the ring when it has been completely folded or compacted as shown in Fig. 3.

The compacted material of Fig. 3 is next disposed in a circular position in some suitable manner as by being received in a cylindrical die sleeve. Thereafter the thick portions 1 of the material A are flattened at the points of bending. This may be effected by dies, as for instance ring dies, or other suitable means. There are produced flat crowns 3 as have been illustrated in Fig. 4.

The flattened material of Fig. 4 is then cut away, as for example by milling, to leave two annular rows of crown portions 3 as shown in Fig. 5. The crown portions 3 are attached to and supported by folded portions of the material A referred to as webs 6.

In Fig. 7 I have shown a finished ring in plan view which includes an inner expander and supporting web portion and outer crown and scraper portions, and in this completely compacted position the edges 5 of the crowns 3 take positions adjacent one another and present substantially continuous relieved outer edges which are particularly adapted to acting as scraper rings for controlling distribution of oil and comprising a satisfactory substitute for conventional rings having spaced-apart separate rails and an expander therefor as above described.

The web portions 6 take the place of a separate spacing member such as has been employed in conventional oil ring assemblies referred to and it will be noted that the webs are out of contact with the cylinder at all times. The position assumed by the webs 6 results in an open fabricated structure admirably suited to acting as a passageway for oil collected on the wall of a cylinder 10 which is to be repassed through the piston 11 and back to the crank case, and there is eliminated the need for carrying out expensive milling operations to effect oil passages in separate spacing members.

The ring of material illustrated in Figs. 6 and 7 presents a still further desirable characteristic especially in connection with taking the place of an expander in the separate scraper ring assembly above used for purposes of comparison. My improved ring furnishes its own expansibility, obviating the provision of a separate expensive expander member, and moreover the ring furnishes a uniform expansibility.

The material, due to its being reversely folded and compacted, may, if composed of a suitable springy material, be highly expansible and contractible. When compressed into a closed circle it may exert a radial force, uniformly in all directions, adapted to deliver a very efficient wall pressure when properly received in a cylinder. It should be noted that this wall pressure is of wide range and is radially uniform when compared with a wall pressure which is obtained from a C-type ring which is of limited range and non-uniform, occurring with the greatest intensity at the ends of the split ring which tend to expand into a greater diameter. The greater expansibility thus available is highly useful in adapting the ring of my invention to use in cylinders badly worn "out-of-round" or worn "tapered" and in effecting a complete wiping or metering action in such cylinder at high speed.

In Figs. 5, 6 and 7 it will be noted that the crown portions 3, in a fully compacted position of the ring, abut along lines 8 and it is pointed out that in order for the ring to develop expansibility, there may occur gaps located in the outer ring edges made up of the crowns. To prevent any substantial passage of fluids therethrough, I have arranged for these gaps to occur in staggered relationship so that a gap in one edge of the ring occurs opposite a solid crown portion in an opposite edge of the ring.

The fabricated material may also be employed as a separate expander member and in Fig. 9 I have illustrated separate oil scraping rings 12 formed with overhanging ends 13 adapted to engage on the wall of a cylinder. The crowns 3 abut against the inner sides 14 of the ends 13 thereby radially expanding the scraper rings. If desired other means of associating my ring material with separate scraper rings may be resorted to, as for example I may effect upturned ends or other holding means at the inside of the webs 6 which may serve as retaining ends for maintaining separate rings.

Another feature of my ring material consists in its being out of contact with the piston except at the point of seating in the piston groove. As a result there is less transfer of "piston slap" on to the cylinder than occurs with conventional expanders which bear against the piston at several points. This feature is equally true whether the ring comprises a unitary oil ring or an expander for an oil ring assembly.

In Figs. 10-15 inclusive I have illustrated a modification of ring which is greatly similar to the finished ring illustrated in Figs. 6, 7 and 8, but which is formed by an improved method.

A length of material B is provided similar to material A of Fig. 1, presenting a thinned portion 16 and resulting relatively thick portion 17.

A first step in forming this material into a ring consists in cutting out sections of the thick portion 17 in some desirable manner as by a punching operation, to leave crown portions 18 connected together by the portion 16 as has been illustrated in Fig. 10.

A further step consists in reversely folding the material illustrated in Fig. 10 into a position as illustrated by Fig. 11. It will be observed that the thinned portion 16 is folded to comprise connecting webs which support, at their tops and bottoms, crown portions 18 located in a nearly abutting position with respect to one another and forming very minute gaps or interstices indicated by the lines 19 in the drawings. The gaps 19 axially in staggered relationship may improve oil metering action of the ring.

The construction illustrated in Fig. 11 has been more clearly set forth in the perspective view of Fig. 13 in which it will be observed that the crowns 18 extend above and below the tops and bottoms of the thinned portion 16. It is intended that such a ring formed in the manner described may be employed without further change to provide thick peripheral edges.

However, it may be found desirable to cut away parts of the projecting portions of crowns 18. For this purpose I may employ any suitable means as by turning in a lathe. There result crown surfaces 20 at the top and bottom of the ring which occur in the same plane with the tops and bottoms of the thinned portion 16, as may be better observed in the perspective view of Fig. 14.

By cutting away crowns 18 along one side thereof so that they occur in the same plane as the tops of portions 16, a larger bearing surface is obtained for the ring to be received in a piston groove. This may result in giving the ring longer life since there is no edge remaining to wear into groove 21 of the piston 22 when operating against a cylinder wall 23.

It will be noted that the webs or thinned portions 16 are angularly disposed, thereby effecting a ring with a less number of such supporting members than is present in the ring indicated in Figs. 1-9 inclusive; and at the same time there are effected openings for oil to pass through which have the advantage of being larger than corresponding openings of the earlier ring referred to. In addition, radial expansion of rings such as shown in Figs. 12 and 14 will result in the ring increasing in height as it wears, tending to maintain substantially uniform seating in a piston groove 21.

It should be observed that Figs. 10-15 inclusive illustrate a method of making an oil ring which is simpler and an improvement on the method illustrated by Figs. 1-9 inclusive. Also, the portions along which the webs are attached to the crowns are greatly increased in length as compared with similar portions found in the ring illustrated in Figs. 1-9 inclusive. This may provide increased resistance to wear. Other advantages already noted with respect to the ring of Figs. 1-9 inclusive are pertinent with respect to the present modification.

It will also be observed that I have provided a unitary oil ring comprising an open structure which includes expansible spaced-apart oil scraping edges and which is suitable for allowing easy passage of oil therethrough.

While I have herein shown and described a preferred embodiment of my invention, it will be understood that changes may be made without departing from the spirit of the invention.

I claim:

1. A piston ring comprising a strip of sheet material folded to form an annular body having crowns and connecting web portions, each of said crowns extending above and below respective adjacent connecting web portions in a direction axially of the ring.

2. A piston ring comprising a strip of sheet metal reversely bent to form a flexible annular body, said body having webs and spaced-apart crowns supported at one side of the webs, said crowns extending beyond the webs in a direction circumferentially of the ring and each of the crowns extending axially beyond the webs in two directions.

3. A piston ring comprising a plurality of T-shaped segments contiguously arranged in annular rows to form opposite sides of the ring, each of said T-shaped segments including a head portion and a leg portion, webs connecting the T-shaped segments together at the leg portions thereof, the head portions of the T-shaped segments being of a greater thickness than the leg portions and the webs.

4. A piston ring comprising spaced-apart sides, web portions for connecting the sides, said sides including a plurality of T-shaped segments having head portions and leg portions, the head portions extending radially beyond the webs and being arranged in contiguous relation to constitute upper and lower oil scraping edges, each of said T-shaped segments having its head portion of greater thickness than the webs.

5. A piston ring comprising spaced-apart sides, connecting webs for the sides, said sides including a plurality of T-shaped segments which extend radially beyond the webs and are arranged in contiguous relation to provide oil scraping edges, said T-shaped segments having portions which are of a greater axial thickness than other portions thereof.

6. A piston ring comprising spaced-apart sides, connecting webs for the sides, said sides including a plurality of T-shaped segments, each of said segments having a head portion and a leg portion, the head portions of the said T-shaped segments extending axially beyond the leg portions in two directions.

7. A piston ring comprising spaced-apart sides, connecting webs for the sides, said sides including a plurality of T-shaped segments, the T-shaped segments having head portions and leg portions, the head portions of the T-shaped segments extending beyond the leg portions radially and also in a direction axially of the ring.

THOMAS A. BOWERS.